April 25, 1967 R. ADLER 3,316,484
MAGNETIC FLUX MEASURING APPARATUS USING
NUCLEAR MAGNETIC RESONANCE
Filed Sept. 15, 1964

INVENTOR.
Robert Adler
BY John J. Pederson
Atty.

United States Patent Office 3,316,484
Patented Apr. 25, 1967

3,316,484
MAGNETIC FLUX MEASURING APPARATUS
USING NUCLEAR MAGNETIC RESONANCE
Robert Adler, Northfield, Ill., assignor to Zenith Radio
Corporation, Chicago, Ill., a corporation of Delaware
Filed Sept. 15, 1964, Ser. No. 396,522
3 Claims. (Cl. 324—.5)

This invention relates generally to nuclear magnetic resonance apparatus and more particularly to such apparatus for measuring the flux density of static magnetic fields, particularly, in the range from 1000 to 100 gauss where it has previously been quite difficult and time consuming to obtain reliable flux measurements.

It has long been recognized that certain substances upon insertion in a static magnetic field of a predetermined magnitude and simultaneous excitation by an alternating magnetic field exhibit a resonance at a frequency of the alternating field which is characteristic of the particular substance and proportional to the intensity of the static field. This phenomenon is known as nuclear magnetic resonance (NMR).

Because the frequency at which the resonance occurs identifies the substance, NMR has provided an effective method for analyzing unknown substances. Conversely, where the sample substance is known, determination of the resonant frequency provides a measurement of the intensity of the static magnetic field. It is this application with which the present invention is concerned.

The resonant disturbance is inherently of an extremely small magnitude; thus, its detection requires highly sensitive apparatus. Many prior art devices, in an attempt to achieve greater sensitivity, have sacrificed stability to the extent that searching for the resonant frequency is often tedious and time consuming, requiring continuous readjustment of the apparatus. In addition, with lower and lower frequency exciting fields the magnitude of the resonant disturbance produced in the measuring equipment is proportionately diminished. This problem becomes particularly acute when measuring static field intensities in the range from 1000 to 100 gauss. Hence, reliable measurement of such magnetic fields with the use of nuclear magnetic resonance devices has heretofore been impossible or required sophisticated apparatus, critical of adjustment and which in practice required an extremely long time to search through a range for an unknown field strength.

It is therefore an object of the present invention to provide new and improved apparatus for measuring the flux density of static magnetic fields.

It is another object of this invention to provide nuclear magnetic resonance apparatus for measuring static magnetic fields having a flux density in the range from 1000 to 100 gauss.

It is a further object of this invention to provide a simple and economical magnetic flux measuring apparatus having excellent operating stability and substantial noise immunity.

Accordingly, the invention is directed to apparatus for measuring the flux density of static magnetic fields of the type comprising an oscillator having a predetermined nominal operating frequency, a nuclear resonance probe adapted for insertion in the magnetic field and exhibiting magnetic resonance at a frequency proportional to the intensity of the magnetic field and which is coupled to and comprises a frequency determining element for the oscillator to deliver a disturbance to the oscillator at the magnetic resonance frequency, means for varying, at a predetermined rate determined by the desired duration of the disturbance, the relationship between the operating frequency of the oscillator and the magnetic resonance frequency of the probe as determined by the strength of the magnetic field, and means for detecting the resultant disturbance in the signal developed by the oscillator. The improvement of the present invention consists of the oscillator comprising a substantially linear amplifier provided with a feedback loop from its output circuit to its input circuit, and means for controlling the loop gain having an effective time constant of at least the same order of magnitude as the duration of the disturbance, so as to render the amplitude disturbance in the signal developed by the oscillator generally proportional to the time integral of the disturbance delivered by the probe.

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

Figure 1:
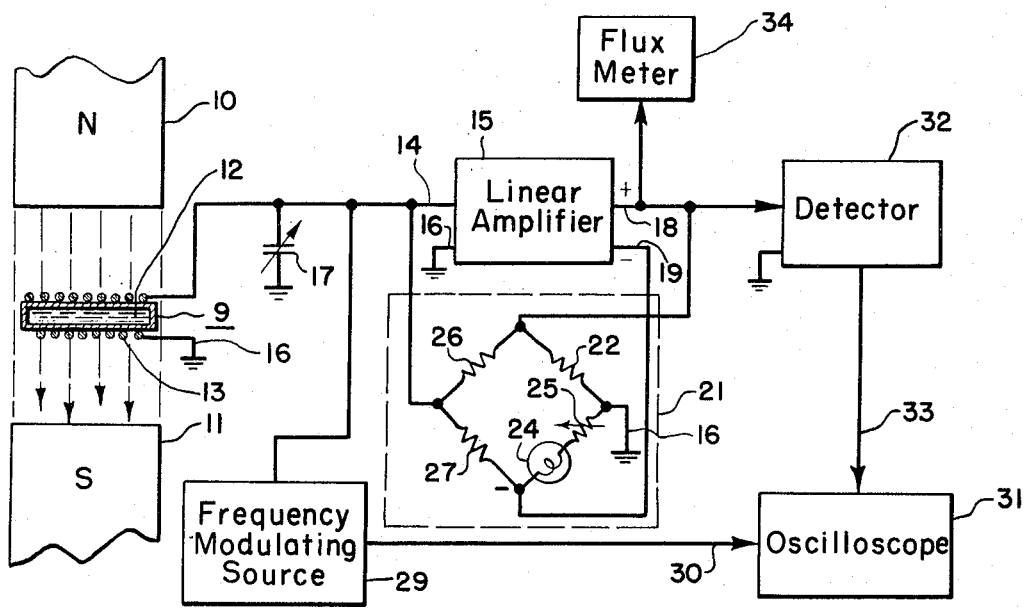
FIGURE 1 is a schematic diagram of a circuit embodying the present invention.

Referring to FIGURE 1, a nuclear magnetic resonance probe 9 is shown inserted in a static magnetic field formed between a pair of magnetic pole pieces 10 and 11. Probe 9 comprises a nuclear-resonance-exhibiting substance 12, such as glycerine, confined within the solenoidal field of an inductor 13. Inductor 13 and a variable capacitor 17 are coupled in parallel relation between an input terminal 14 of a linear amplifier 15 and a plane of reference potential, such as ground 16, to which the other input terminal of amplifier 15 is connected. Elements 13, 17 form a parallel tuned input circuit for amplifier 15.

Preferably, amplifier 15 includes at least two stages of RF amplification followed by a phase splitting output stage for developing similar signals of opposite phase at output terminals 18 and 19. In general, unit 15 is of conventional construction and in accordance with the invention is adapted to operate in a linear or class A manner over the chosen range of amplitudes. Regenerative feedback for amplifier 15 is provided by a feedback loop 21 coupled from output terminals 18, 19 to input terminal 14. As illustrated, network 21 includes a resistor 22 coupled from terminal 18 to ground and a series combination of a signal responsive element 24, such as a thermistor, and an adjustable resistor 25 coupled from terminal 19 to ground 16. Terminals 18 and 19 are also returned to input terminal 14 by a pair of coupling resistors 26 and 27, respectively. Of course, thermistor 24 herein assumed to have a positive thermal coefficient, may be replaced by a thermistor in series with resistor 22 having a negative thermal coefficient.

It will be recognized that amplifier 15, feedback network 21, and tuned circuit 13, 17 comprise an oscillator, the properties and characteristics of which will be described in due course. Also in accordance with the invention, element 24 is constructed with an effective time constant of at least the same order of magnitude, and preferably approximately equal to, the duration of the amplitude disturbance delivered by probe 9 as the oscillator frequency is swept through its magnetic resonance frequency, thus controlling the loop gain of amplifier 15 to render the amplitude disturbance in the signal developed by the oscillator generally proportional to the time integral of the disturbance delivered by the probe, thereby enabling practical and efficient measurement of static magnetic fields in the range from 1000 down to 100 gauss.

Means for detecting resonance include an amplitude detection device 32 of conventional construction coupled to output terminal 18 of amplifier 15 and by way of lead 33 to the vertical deflection system of a conventional oscilloscope 31. As will be apparent to those skilled in the art, a mechanical recorder, a conventional meter or similar indicating device may be employed in place of oscilloscope 31. A flux meter 34 also connected to output terminal 18 is preferably calibrated to provide a direct-reading indication of the magnetic flux density between pole pieces 10 and 11 at the resonant frequency of substance 12. Flux meter 34 may, for example, be a conventional frequency counter in which case the flux density is calculated from the measured resonant frequency.

A frequency modulating device 29 is coupled to input terminal 14 of amplifier 15 and by a conductor 30 to the horizontal deflection circuit of oscilloscope 31. Device 29 may include a low frequency oscillator and an element such as a voltage-responsive capacitor to present a sinusoidally varying capacitance of small magnitude to the tuned tank circuit 13, 17. The low frequency oscillator within device 29 controls the horizontal sweep rate for oscilloscope 31. Device 29 provides means for varying, at a predetermined rate determined by the desired duration of the resonant disturbance, the relationship between the operating frequency of the oscillator and the magnetic resonance frequency of probe 9. As is well-known to those familiar with the art, alternate methods are available to accomplish this objective. For instance, an alternating magnetic field of small magnitude may be superimposed on the static magnetic field between pole pieces 10 and 11.

With regard to the operation of the described circuit, linear amplifier 15, feedback network 21 and tuned circuit 13, 17 comprise an oscillator having a frequency of oscillation determined principally by the resonant frequency of elements 13, 17. Adjustable capacitor 17 provides means for broadly varying the nominal operating frequency of the oscillator; however, for optimum sensitivity in conjunction with widely varied operating frequencies it is desirable to employ separate probes designed especially for the particular operating range. The construction and design of such probes are generally well-known and constitute no part of the present invention, and therefore, will not be discussed in further detail.

In utilizing the detection circuit of the invention, the oscillator, by adjustment of capacitor 17, is set to a frequency which corresponds as closely as can be estimated to the intensity of the magnetic field to be measured. The net regenerative feedback through network 21 is adjusted to an amplitude sufficient to sustain oscillation and yet maintain the amplifier in a linear operating condition. This is accomplished by adjusting variable resistor 25 until the algebraic sum of the voltages developed across arms 22 and 24, 25 and returned to input 14 by resistors 26 and 27, respectively is of the appropriate magnitude.

Assuming for the moment that no disturbance, such as resonance, is present, the amplitude of the signal as detected by unit 32 remains substantially constant. The frequency of oscillation, however, varies sinusoidally about a nominal tuned value as a result of the small variable capacitance presented to the tuned circuit by the frequency modulating device 29. Also the sweep rate established by modulating device 29 determines the duration of the resonant disturbance, should a nuclear magnetic resonance lie within the scanned frequency band. The visual display accorded on oscilloscope 31 in the absence of such a resonance is a straight line displaced vertically by an amount proportional to the voltage at output 33 of detector 32 and scanned horizontally at rate corresponding to the frequency of modulating device 29.

In the presence of a resonant disturbance, there is an absorption of energy from tank circuit 13, 17 by the resonant substance 12 which in circuit terms appears as an added conductance shunting the tuned probe circuit. The circuit of the invention makes use of the fact that the added circuit loss or increase in conductance occasioned during resonance is not compensated or suppressed in any manner if amplifier 15 has been adjusted to operate in a linear fashion and signal responsive element 24 has been chosen to have a sufficiently long time constant.

Thus, in accordance with the invention the amplitude of oscillation is substantially independent of the non-linear characteristics of the amplifying devices of the oscillator and is determined as exclusively as practicable by an automatic gain control system which has a characteristically long time constant. In the illustrated embodiment, a modified Meacham oscillator is employed, but it is obvious to those conversant with the art that a number of alternative designs comply with the above recited criteria. For instance, the oscillator may include a multi-grid tube having a variable transconductance which is responsive, after a predetermined time delay, to a control signal derived from the amplitude of oscillation controlling the loop gain in the described manner.

Figure 2:
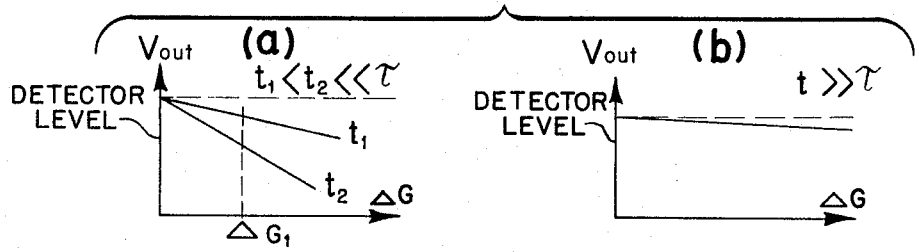
FIGURES 2a and 2b are graphical representations helpful in explaining the operation of the circuit of FIGURE 1.

The operation of the circuit of the invention may be better understood by reference to FIGURES 2a and 2b. In these figures, the amplitude of oscillation as detected by unit 32 is plotted as a function of incremental changes in conductance, $\Delta G$, of the probe 9 for observation periods $t_1$ and $t_2$ bearing the indicated relation to the time constant $\tau$ of the oscillator; the sweep rate established by device 29 is such that the duration of the resonant disturbance and the oscillator time constant are approximately equal. In practice it has been been found convenient to establish these times at approximately .1 second. This corresponds to a 10 cycle per second sweep rate by device 29 which also provides an easily viewable trace on scope 31.

As shown in FIGURE 2a, for a given resonant disturbance $\Delta G_1$, the detected amplitude of oscillation decreases at an approximately linear rate with time for periods of time less than $\tau$. FIGURE 2b shows that the detected amplitude is substantially independent of increments in probe conductance for periods of time substantially greater than the time constant. This is a direct result of the predetermined long time period required for stabilization of oscillation amplitude produced by thermistor 24.

Figure 3:
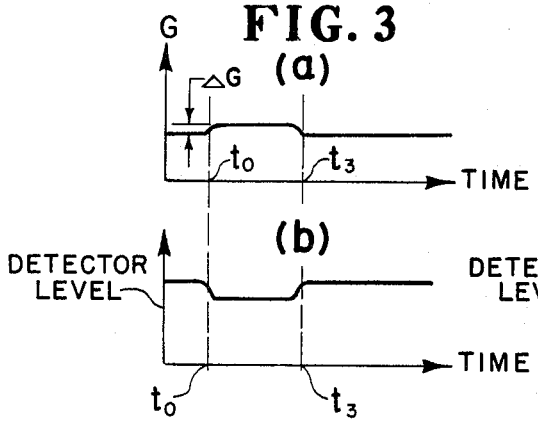
FIGURES 3a and 3b are graphical representations illustrating typical operating characteristics of a prior art nuclear magnetic flux measuring circuit.

Previous magnetic resonance flux measuring systems have employed oscillator circuits in which the loop gain is stabilized by a non-linear characteristic of the active amplifying element. For example, perhaps the most common method for stabilizing the loop gain of an oscillator makes use of the non-linear saturation characteristics of an electron tube or transistor. As is well-known, amplitude limiting of this sort tends to instantaneously suppress perturbations in loading, etc. by immediately adjusting to a new equilibrium amplitude of oscillation. Another familiar form of amplitude control is obtained by grid-leak bias. As is also well-known, in this form of amplitude control a portion of the electron tube signal current is intercepted by the control grid and a capacitor-resistor combination in the grid circuit sums or integrates this current over time to establish a grid bias which is inversely related to the gain of the tube. For disturbances in loading, similar to that occurring at resonance, oscillators employing either of the above described methods of amplitude control respond essentially identically. An understanding of their operation may be had by reference to FIGURES 3a and 3b. In FIGURE 3a, the load conductance of a tuned probe circuit similar to probe 9 is plotted as a function of time as the probe is passed through resonance. As illustrated, between $t_0$ and $t_3$, as the oscillator frequency sweeps through resonance of the probe, there is a resonant absorption of energy by the sample substance thereby resulting in an increased probe conductance. In FIGURE 3b, the detected level of oscillation is plotted against the same time axis shown in FIGURE 3a. As is clear from the drawing, the oscillator responds to the disturbance and attains a new equilibrium level of oscillation almost instantaneously upon its occurrence.

Figure 4:
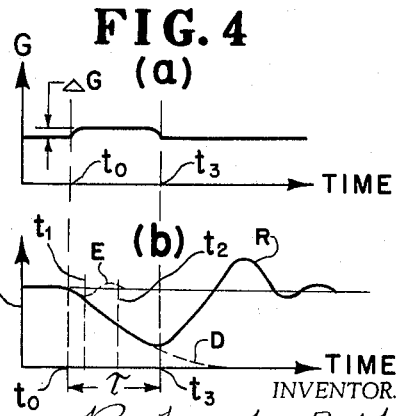
FIGURES 4a and 4b are graphical representations useful in understanding the invention.

In flux measuring apparatus of the present invention, amplitude control is achieved by providing the oscillator with an effective time constant of at least the same order of magnitude as, and preferably approximately equal to, the duration of the disturbance delivered by the probe as it is swept through magnetic resonance, and the resulting operation is materially different. FIGURE 4a illustrates a disturbance in probe conductance of a magnitude and a duration identical to that shown in FIGURE 3a. The detected response visible on oscilloscope 31 is shown in FIGURE 4b. Because the effective oscillator time constant is long relative to the transient variations in load conductance, the oscillator circuit is unable to compensate for the increased probe conductance, and the amplitude of the detected signal initially decreases at a substantially linear rate which is generally proportional to the time integral of the load disturbance of FIGURE 4a. As is shown by the dashed line labeled D, in the absence of a compensating means the amplitude of oscillation would continue to fall until oscillation ceased. However, as the oscillation amplitude falls, the resistance of thermistor 24 is also reduced but with a delay corresponding to the thermal lag of this element, and with the optimum design the change in oscillation amplitude is reversed at a time $t_3$ corresponding to the termination of the resonant disturbance delivered by probe 9. Thereafter the oscillation amplitude increases rapidly to a peak level R above the initial or steady state level, which it thereafter resumes after one or more additional excursions of greatly reduced amplitude. Because the peak to peak amplitude disturbance is many times greater than that achieved with prior art devices, as exemplified by the operating characteristics of FIGURE 3, the apparatus of the present invention provides correspondingly increased sensitivity at a given flux density. In practice, it has been found that the apparatus of the invention permits accurate direct measurement of flux densities in the range from 100 to 1000 gauss, a range not previously susceptible to practical, efficient measurement by nuclear magnetic resonance apparatus or otherwise. Experimental tests have revealed that the overshoot peak R, and thus the net amplitude fluctuation, is maximized by adjusting the effective time constant of the oscillator to be substantially equal to the duration of the resonant disturbance. It is this condition that is illustrated in FIGURE 4b.

As previously mentioned, the described magnetic flux measuring circuit is substantially unresponsive to noise signals. Assuming, as is usually the case, that the noise signal is of a very short duration compared to the preferred .1 second duration of the resonant disturbance, a typical response to a noise impulse is shown by dashed curve E in FIGURE 4b. Thus, from the diagram it is shown that the oscillator of the described measuring circuit is relatively insensitive to very short disturbances, quite sensitive to unilateral disturbances having a duration approximating $\tau$, and quite insensitive to disturbances of a duration substantially greater than $\tau$.

In summary, the novel magnetic flux measuring circuit of the invention provides greatly improved sensitivity as compared with prior art magnetic resonance devices, thereby for the first time providing for accurate and direct practical measurement of static low-gauss magnetic fields in the range from 100 to 1000 gauss. As is clear from the description, the circuit is of simple and economical construction, yet possesses excellent stability and substantial noise immunity.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:
1. Apparatus for measuring the flux density of static magnetic fields of the type comprising an oscillator having a predetermined nominal operating frequency, a nuclear resonance probe adapted for insertion in said magnetic field, exhibiting magnetic resonance at a frequency proportional to the intensity of said magnetic field and coupled to and comprising a frequency determining element for said oscillator to deliver a disturbance to said oscillator at said magnetic resonance frequency, means for varying, at a predetermined rate determined by the desired duration of said disturbance, the relationship between the operating frequency of said oscillator and the magnetic resonance frequency of said probe as determined by the strength of said magnetic field, and means for detecting the resultant disturbance in the signal developed by said oscillator when said probe resonant frequency and said oscillator frequency coincide:

the improvement which consists of said oscillator comprising a substantially linear amplifier provided with a feedback loop from its output circuit to its input circuit, said feedback loop being constructed and arranged to provide a feedback signal to said input circuit which is a function of the amplitude of the signal present at said output circuit, and means for controlling the loop gain having an effective time constant of at least the same order of magnitude as said duration of said disturbance so as to render the amplitude disturbance in the signal developed by said oscillator generally proportional to the time integral of the disturbance delivered by said probe.

2. Apparatus for measuring the flux density of static magnetic fields of the type comprising an oscillator having a predetermined nominal operating frequency, a nuclear resonance probe adapted for insertion in said magnetic field exhibiting magnetic resonance at a frequency proportional to the intensity of said magnetic field and coupled to and comprising a frequency determining element for said oscillator to deliver a disturbance to said oscillator at said magnetic resonance frequency, means for varying, at a predetermined rate determined by the desired duration of said disturbance, the relationship between the operating frequency of said oscillator and the magnetic resonance frequency of said probe as determined by the strength of said magnetic field, and means for detecting the resultant disturbance in the signal developed by said oscillator when said probe resonant frequency and said oscillator frequency coincide:

the improvement which consists of said oscillator comprising a substantially linear amplifier having an input and an output and provided with a feedback network from said output to said input, said network being constructed and arranged to provide a feedback signal to said input circuit which is a function of the amplitude of the signal present at said output circuit and comprising an element responsive to the signal level of said oscillator and having a time constant of at least the same order of magnitude as said duration of said disturbance for controlling the loop gain of said amplifier to render the amplitude disturbance in the signal developed by said oscillator generally proportional to the time integral of the disturbance delivered by said probe.

3. Apparatus for measuring the flux density of static magnetic fields of the type comprising an oscillator having a predetermined nominal operating frequency, a nuclear resonance probe adapted for insertion in said magnetic field exhibiting magnetic resonance at a frequency proportional to the intensity of said magnetic field and coupled to and comprising a frequency determining element for said oscillator to deliver a disturbance to said oscillator at said magnetic resonance frequency, means for varying, at a predetermined rate determined by the desired duration of said disturbance, the relationship between the operating frequency of said oscillator and the magnetic resonance frequency of said probe as determined by the strength of said magnetic field, and means for detecting the resultant disturbance in the signal developed by said oscillator when said probe resonant frequency and said oscillator frequency coincide:

the improvement which consists of said oscillator comprising a substantially linear amplifier having an input and an output and provided with a feedback network from said output to said input, said network being constructed and arranged to provide a feedback signal to said input circuit which is a function of the amplitude of the signal present at said output circuit and comprising a thermistor having a time constant of approximately the same duration as said duration of said disturbance for controlling the loop gain of said amplifier to render the amplitude disturbance in the signal developed by said oscillator generally proportional to the time integral of the disturbance delivered by said probe.

References Cited by the Examiner

UNITED STATES PATENTS

| | | | |
|---|---|---|---|
| 2,423,505 | 7/1947 | Landon | 331—140 |
| 3,112,441 | 11/1963 | Robinson | 324—.5 |
| 3,140,440 | 7/1964 | Senstad | 324—.5 |

OTHER REFERENCES

Robinson: Journal of Scientific Instruments, vol. 36, December 1959, pp. 481–487 relied on.

Robinson: The Review of Scientific Instruments, vol. 34, No. 11, November 1963, page 1260.

Pound et al.: The Review of Scientific Instruments, vol. 21, No. 3, March 1950, pp. 219–224.

WALTER L. CARLSON, *Primary Examiner.*

MAYNARD R. WILBUR, *Examiner.*

M. J. LYNCH, *Assistant Examiner.*